(12) United States Patent
Yagi et al.

(10) Patent No.: US 11,209,117 B2
(45) Date of Patent: Dec. 28, 2021

(54) TRANSPORTATION PIPE

(71) Applicant: FURUKAWA ELECTRIC CO., LTD., Tokyo (JP)

(72) Inventors: Masashi Yagi, Tokyo (JP); Hiroyuki Fukushima, Tokyo (JP); Tomohiro Takagi, Tokyo (JP)

(73) Assignee: FURUKAWA ELECTRIC CO., LTD., Tokyo (JP)

(\*) Notice: Subject to any disclaimer, the term of this patent is extended or adjusted under 35 U.S.C. 154(b) by 62 days.

(21) Appl. No.: 16/321,386

(22) PCT Filed: Jul. 28, 2017

(86) PCT No.: PCT/JP2017/027359
§ 371 (c)(1),
(2) Date: Jan. 28, 2019

(87) PCT Pub. No.: WO2018/021509
PCT Pub. Date: Feb. 1, 2018

(65) Prior Publication Data
US 2019/0162357 A1    May 30, 2019

(30) Foreign Application Priority Data

Jul. 29, 2016  (JP) .............................. JP2016-149106

(51) Int. Cl.
*F16L 59/14* (2006.01)
*F16L 59/18* (2006.01)
(Continued)

(52) U.S. Cl.
CPC ............. *F16L 59/14* (2013.01); *F16L 59/065* (2013.01); *F16L 59/141* (2013.01); *F16L 59/182* (2013.01); *F16L 59/22* (2013.01)

(58) Field of Classification Search
CPC .......... F16L 59/14; F16L 59/182; F16L 59/22
See application file for complete search history.

(56) References Cited

U.S. PATENT DOCUMENTS 2,696,835 A * 12/1954 Kaiser .................... F16L 59/14
                                                    138/101
2,924,245 A *  2/1960 Wilson ................... F16L 59/14
                                                    138/149
(Continued)

FOREIGN PATENT DOCUMENTS

EP      0 229 345 B1    3/1989
GB      1 363 076       8/1974
(Continued)

OTHER PUBLICATIONS

International Preliminary Report on Patentability and Written Opinion dated Jan. 29, 2019 PCT/JP2017/027359 (with English translation).

(Continued)

*Primary Examiner* — David Bochna
*Assistant Examiner* — James A Linford
(74) *Attorney, Agent, or Firm* — Oblon, McClelland, Maier & Neustadt, L.L.P.

(57) ABSTRACT

A transportation pipe includes a main-body vacuum insulated pipe, a central pipe, and a connecting vacuum insulated pipe. The main-body vacuum insulated pipe including a double pipe structure includes a vacuum part in a region between an inner pipe and an outer pipe. The central pipe through which a fluid to be transported flows, is arranged in the main-body vacuum insulated pipe. The connecting vacuum insulated pipe having a double pipe structure includes a vacuum part in a region between an inner pipe and an outer pipe. In a state in which two main-body vacuum insulated pipes are inserted into the connecting vacuum insulated pipe from respective ends of the connecting vacuum insulated pipe, ends of the main-body vacuum insulated pipes are away from one another, and the main- (Continued)

body vacuum insulated pipes are connected to one another via the connecting vacuum insulated pipe.

12 Claims, 2 Drawing Sheets

(51) Int. Cl.
*F16L 59/22* (2006.01)
*F16L 59/065* (2006.01)

(56) References Cited

U.S. PATENT DOCUMENTS

| | | | | |
|---|---|---|---|---|
| 3,068,026 | A * | 12/1962 | McKamey | F16L 39/005 285/47 |
| 3,207,533 | A * | 9/1965 | Richards | F16L 59/065 285/31 |
| 3,410,313 | A * | 11/1968 | Martin | C23F 13/18 138/103 |
| 4,107,946 | A * | 8/1978 | Potter | F16L 59/065 62/50.7 |
| 2010/0229992 | A1* | 9/2010 | Witz | F16L 59/147 138/109 |
| 2011/0186169 | A1* | 8/2011 | Pionetti | F16L 39/005 138/114 |
| 2011/0233923 | A1* | 9/2011 | Kouketsu | F16L 59/182 285/123.3 |

FOREIGN PATENT DOCUMENTS

| | | |
|---|---|---|
| JP | 57-65294 U3 | 10/1980 |
| JP | 61-32895 U | 2/1986 |
| JP | 62-204095 U | 12/1987 |
| JP | 11-193899 A | 7/1999 |
| JP | 2001-41390 A | 2/2001 |
| JP | 2002-130547 A | 5/2002 |
| JP | 3523085 B2 | 4/2004 |
| JP | 2016-65629 A | 4/2016 |

OTHER PUBLICATIONS

Combined Chinese Office Action and Search Report dated Jan. 21, 2020 in Chinese Patent Application No. 201780045092.7 (with unedited computer generated English translation). 13 pages.
Combined Chinese Office Action and Search Report dated Sep. 18, 2020, in Patent Application No. 201780045092.7 (with English translation), 13 pages.
International Search Report dated Oct. 17, 2017 in PCT/JP2017/027359 filed on Jul. 28, 2017.
Notice of Reasons for Refusal dated Apr. 20, 2021 in corresponding Japanese Patent Application No. 2018-530409 (with English translation)(7 pages).
Japanese Office Action dated Sep. 7, 2021, issued in Japanese Patent Application No. 2018-530409 (with English translation).

* cited by examiner

TRANSPORTATION PIPE

TECHNICAL FIELD

The present invention relates to a transportation pipe which insulates a fluid that is made to flow inside.

BACKGROUND ART

In general, to insulate, from heat, and send a fluid having a lower or higher temperature than room temperature, such as a low-temperature refrigerant, a high-temperature liquid, or a high-temperature vapor, a pipe therefor is insulated.

For example, in the field of treating extremely-low-temperature liquid helium, in a triple pipe structure having a vacuum jacket as the outermost layer, a second pipe arranged therein, and a first pipe arranged in the second pipe, the liquid helium is made to flow in the first pipe, low-temperature helium gas is made to flow between the first pipe and the second pipe, and space between the second pipe and the vacuum jacket is evacuated (purged of air), so that heat intrusion into the liquid helium, which flows in the first pipe, is suppressed, and the insulation is performed. (Refer to, for example, Patent Literature 1.)

CITATION LIST

Patent Literature

Patent Literature 1: JP 3523085 B

SUMMARY OF INVENTION

Technical Problem

In the triple pipe structure of Patent Literature 1, long piping is not considered. In the case of long piping, it is difficult to form the vacuum jacket, which is the outermost layer, as a single component, and hence two or more vacuum jackets need to be used by being connected to one another.

However, Patent Literature 1 does not mention connecting vacuum jackets to one another, and hence the triple pipe structure cannot deal with a long length of a path of piping.

If an ordinary technical level is taken into account, there may be an idea of connecting ends of plural vacuum jackets by welding to insulate long piping. However, this may, for example, break the welded part(s) by the heat. Then, testing, such as radiographic, ultrasonic, or penetrant testing, needs to be performed on the welded vacuum jackets, and it is expected that much effort and time are required at a construction site.

Objects of the present invention include providing a transportation pipe which is excellent in workability and can deal with long distance transportation.

Solution to Problem

The invention stated in claim 1 is a transportation pipe including;

a main-body vacuum insulated pipe having a double pipe structure, including a vacuum part in a region between an inner pipe and an outer pipe;

a central pipe which is arranged in the main-body vacuum insulated pipe, and through which a fluid to be transported flows; and a connecting vacuum insulated pipe having a double pipe structure, including a vacuum part in a region between an inner pipe and an outer pipe, wherein in a state in which two main-body vacuum insulated pipes of the main-body vacuum insulated pipe are inserted into the connecting vacuum insulated pipe from respective ends of the connecting vacuum insulated pipe, ends of the two main-body vacuum insulated pipes are away from one another, and the two main-body vacuum insulated pipes are connected to one another via the connecting vacuum insulated pipe.

The invention stated in claim 2 is the transportation pipe according to claim 1, wherein the two main-body vacuum insulated pipes each are connected to the connecting vacuum insulated pipe while keeping a slidable state with respect to the connecting vacuum insulated pipe.

The invention stated in claim 3 is the transportation pipe according to claim 1 or 2, wherein the outer pipe of the main-body vacuum insulated pipe is a straight pipe.

The invention stated in claim 4 is the transportation pipe according to any one of claims 1 to 3, wherein the inner pipe of the connecting vacuum insulated pipe is a straight pipe.

The invention stated in claim 5 is the transportation pipe according to any one of claims 1 to 3, wherein the connecting vacuum insulated pipe is corrugated over a full length or a part of the length.

The invention stated in claim 6 is the transportation pipe according to any one of claims 1 to 5, wherein the connecting vacuum insulated pipe has a halved structure.

The invention stated in claim 7 is the transportation pipe according to any one of claims 1 to 6, wherein a spacer is provided between the central pipe and the main-body vacuum insulated pipe.

The invention stated in claim 8 is the transportation pipe according to any one of claims 1 to 7, wherein a seal material is provided between the connecting vacuum insulated pipe and the main-body vacuum insulated pipe.

Advantageous Effects of Invention

The present invention is configured such that plural main-body vacuum insulated pipes are connected by a connecting vacuum insulated pipe (s), and hence can easily deal with a long transportation distance. Further, each main-body vacuum insulated pipe does not need to be longer than necessary. Hence, the main-body vacuum insulated pipes and the connecting vacuum insulated pipes can be manufactured with their vacuum parts formed, at a factory or the like in advance.

Hence, at the time of construction, no air purging or testing for the vacuum state is needed at the site, and the construction can be easy. Thus, a transportation pipe having high workability can be provided.

Further, the main-body vacuum insulated pipes can be connected to one another by being inserted into the connecting vacuum insulated pipe (s). Hence, no welding work or the like is needed, and, in this case, no testing after welding is needed, either. From this perspective too, the workability can be improved.

DESCRIPTION OF EMBODIMENTS

[Outline of Embodiments of Present Invention]

Figure 1:
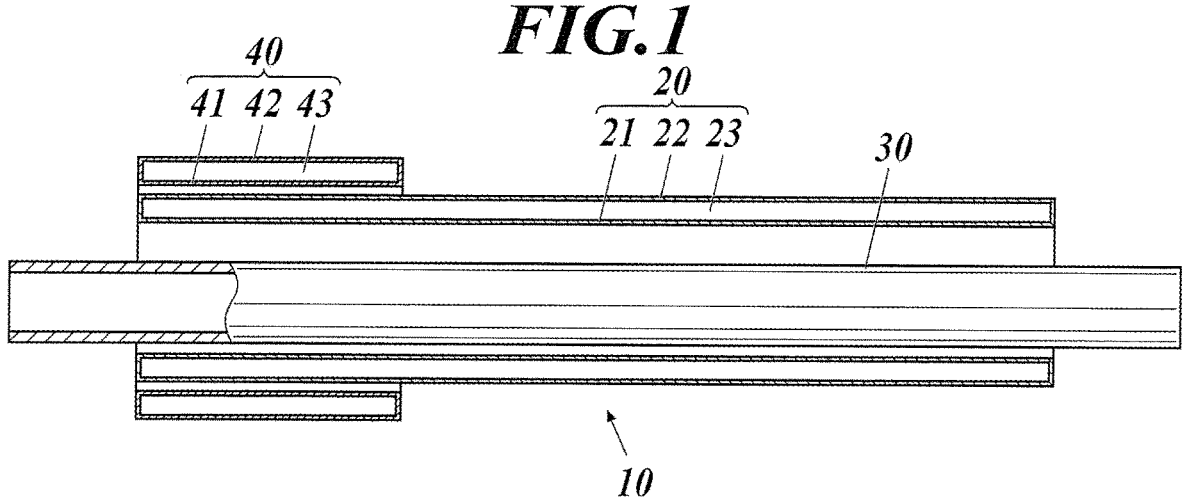
FIG. 1 is a cross-sectional view of some components of a transportation pipe as an embodiment of the present invention in a before-connected state.

Hereinafter, a preferred embodiment (s) for carrying out the present invention will be described with reference to the drawings. Various limitations which are technically preferable for carrying out the present invention are put on the embodiment (s) described below. However, the scope of the present invention is not limited to the embodiment (s) below or illustrated instances.

Same or like components are given the same reference signs in the drawings fittingly, and redundant descriptions are omitted if it is appropriate. The drawings are schematic, and it should be noted that a size relationship between components and so forth may be different from the real ones. The size relationship or ratio may also be partly different between the drawings.

FIG. 1 is a cross-sectional view of some components of a transportation pipe 10 as an embodiment in a before-connected state.

The transportation pipe 10 is for transporting, in a heat insulation state, a fluid (hereinafter called "transportation substance") having a higher or lower temperature than room temperature, such as a low-temperature refrigerant (e.g., −200° C.), a high-temperature liquid, or a high-temperature vapor (e.g., 600° C.), as a transportation target.

The transportation pipe 10 includes units each of which includes a main-body vacuum insulated pipe 20 having a double pipe structure, a central pipe 30 which is arranged in the main-body vacuum insulated pipe 20 and through which the transportation substance flows, and a connecting vacuum insulated pipe 40 having a double pipe structure which connects two main-body vacuum insulated pipes 20 to one another. The units each shown in FIG. 1 being connected to one another make longer distance transportation of the transportation substance available.

[Central Pipe]

Each central pipe 30 is a circular pipe in which the transportation substance is made to flow, and has a proper thickness to obtain strength to withstand internal pressure due to the transportation substance. The central pipe 30 is formed of a metal material (e.g., carbon steel, nickel steel alloy, stainless steel, etc.) to withstand heating or cooling as, well as thermal expansion or thermal contraction due to the transportation substance having a high or low temperature. As the central pipe 30, a straight pipe the pipe wall of which is not rugged or corrugated is used.

An end of a central pipe 30 is joined to an end of another central pipe 30 by welding with no space in between.

[Main-body Vacuum Insulated Pipe]

Each main-body vacuum insulated pipe 20 includes an inner pipe 21 and an outer pipe 22 which are cylindrical and have the same length, and a gap between the pipes at each of the both ends is completely sealed up to make the inside airtight, and a vacuum part 23 is formed by evacuating (purging air from) the region between the inner pipe 21 and the outer pipe 22. Thus, the main-body vacuum insulated pipe 20 has a double pipe structure having the vacuum part 23 between the inner pipe 21 and the outer pipe 22, and hence can show high heat-insulating performance to the central pipe 30 arranged in the inner pipe 21.

The main-body vacuum insulated pipe 20 is formed of a metal material (e.g., stainless steel, etc.) in light of processability, strength, durability, easy thinning, and so forth.

As each of the inner pipe 21 and the outer pipe 22 of the main-body vacuum insulated pipe 20, the straight pipe, the pipe wall of which is not rugged or corrugated, is used.

The main-body vacuum insulated pipe 20 is somewhat shorter than the central pipe 30, and when the central pipe 30 is arranged in the main-body vacuum insulated pipe 20, both ends of the central pipe 30 protrude from their corresponding ends of the main-body vacuum insulated pipe 20 to the outside.

[Connecting Vacuum Insulated Pipe]

Each connecting vacuum insulated pipe 40 includes an inner pie 41 and an outer pipe 42 which are cylindrical and have the same length, and a gap between the pipes at each of the both ends is completely sealed up to make the inside airtight, and a vacuum part 43 is formed by evacuating (purging air from) the region between the inner pipe 41 and the outer pipe 42. Thus, the connecting vacuum insulated pipe 40 has a double pipe structure having the vacuum part 43 between the inner pipe 41 and the outer pipe 42.

The connecting vacuum insulated pipe 40 is formed of a metal material (e.g., stainless steel, etc.) in light of processability, strength, durability, easy thinning, and so forth.

Each connecting vacuum insulated pipe 40 is for connecting ends of two main-body vacuum insulated pipes 20 to one another.

The inner diameter of the inner pipe 41 of the connecting vacuum insulated pipe 40 is slightly larger than the outer diameter of the outer pipe 22 of the main-body vacuum insulated pipe 20.

From both ends of the connecting vacuum insulated pipe 40, ends of two main-body vacuum insulated pipes 20 are inserted so that the ends of the two main-body vacuum insulated pipes 20 can be connected to one another. The connecting vacuum insulated pipe 40 can freely slide in both an axial direction and a rotation direction around the axis with respect to the main-body vacuum insulated pipes 20. For example, if, as each of the outer pipe of the main-body vacuum insulated pipe and the inner pipe of the connecting vacuum insulated pipe, a corrugated pipe is used, the mutual sliding movement in the axial direction cannot be performed freely, and also the mutual sliding in the rotation direction around the axis is significantly limited. However, if, as at least one of the outer pipe 22 of the main-body vacuum insulated pipe 20 and the inner pipe 41 of the connecting vacuum insulated pipe 40, not the corrugated pipe but the straight pipe is used, the mutual sliding movement in the axial direction and sliding movement in the rotation direction around the axis can be performed excellently. The main-body vacuum insulated pipes 20 and the connecting vacuum insulated pipe 40 may be fixed to one another by welding or the like after they are settled at their predetermined positions.

The ends of the two main-body vacuum insulated pipes 20 are away from one another. If, in this state, the two main-body vacuum insulated pipes 20 and the connecting vacuum insulated pipe 40 are not fixedly coupled to one another by welding or the like, their positions can be adjusted in the future by the mutual sliding movement in the axial direction or sliding in the rotation direction around the axis. Further, if external force to make the two main-body vacuum insulated pipes 20 away from one another or close to one another or external force in a twist direction is applied thereto owing to temperature change or another external factor, the mutual sliding movement in the axial direction or sliding in the rotation direction around the axis occurs. This can prevent generation of their mutual stress and damage/destruction.

In FIG. 1, a gap between the main-body vacuum insulated pipe 20 and the connecting vacuum insulated pipe 40 is largely shown. Preferably, however, the gap is as small as possible while it makes the sliding movements available.

As each of the inner pipe 41 and the outer pipe 42 of the connecting vacuum insulated pipe 40, the straight pipe, the pipe wall of which is not rugged or corrugated, is used. Alternatively, as described above, at least one of the inner pipe 41 of the connecting vacuum insulated pipe 40 and the outer pipe 22 of the main-body vacuum insulated pipe 20 is not rugged or corrugated. Consequently, the connecting vacuum insulated pipe 40 and the main-body vacuum insulated pipes 20 can freely slide in both the axial direction and the rotation direction around the axis with respect to one another. For example, the outer pipe 22 of the main-body vacuum insulated pipe 20 being the straight pipe can make the mutual sliding movements in the axial direction and the rotation direction around the axis excellent.

Because each connecting vacuum insulated pipe 40 is for connecting two main-body vacuum insulated pipes 20 by their ends being inserted thereinto, a sufficient length thereof is (i) for the ends of the two main-body vacuum insulated pipes 20 to be inserted from its both sides and (ii) to ensure some insertion margin, and hence quite shorter than the length of each main-body vacuum insulated pipe 20.

[Construction of Transportation Pipe]

Figure 2:
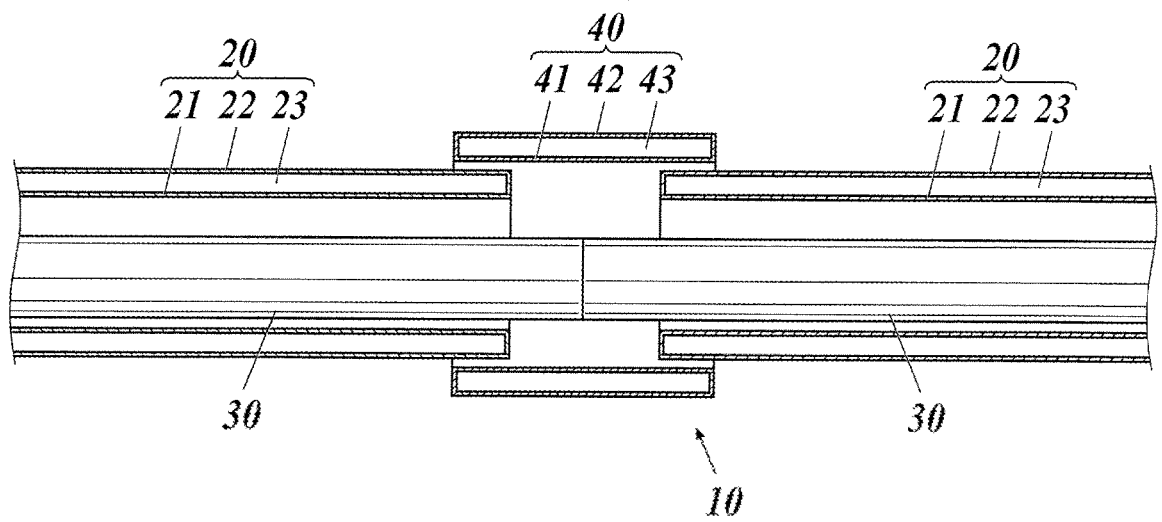
FIG. 2 is a cross-sectional view of the transportation pipe in which ends of two central pipes are connected to one another, and ends of two main-body vacuum insulated pipes are connected to one another.

FIG. 2 shows a state in which ends of two central pipes 30 are connected to one another, and ends of two main-body vacuum insulated pipes 20 are connected to one another, in constructing the transportation pipe 10.

As shown in FIG. 2, the ends of the two central pipes 30 are directly connected to one another by welding.

The main-body vacuum insulated pipes 20 are not fixed to the central pipes 30. Hence, the ends of the main-body vacuum insulated pipes 20 can be away from the connection point of the central pipes 30. Further, the connecting vacuum insulated pipe 40 is slidingly movable with respect to the main-body vacuum insulated pipes 20. Hence, the connecting vacuum insulated pipe 40 can also be away from the connection point of the central pipes 30.

Thus, the ends of the main-body vacuum insulated pipes 20 and the connecting vacuum insulated pipe 40 can be away from the connected ends of the central pipes 30. Hence, there is no problem when nondestructive (radiographic, ultrasonic, penetrant, etc.) testing is performed on the welded and connected ends of the central pipes 30 to inspect the airtight state and the joint strength. A pressure test can also be performed on the connected central pipes 30.

The ends of the main-body vacuum insulated pipes 20 each are arranged a certain distance (at least shorter than ½ of the full length of the connecting vacuum insulated pipe 40, e.g., about ¼ thereof) away from the connection point of the central pipes 30. The main-body vacuum insulated pipes 20 are fixed to a support base formed for holding the main-body vacuum insulated pipes 20 at an installation place.

The connecting vacuum insulated pipe 40 is slidingly moved with respect to the main-body vacuum insulated pipes 20 to be arranged such that its center point in the lengthwise direction agrees with the connection point of the central pipes 30. This creates the state, shown in FIG. 2, in which the ends of the main-body vacuum insulated pipes 20 are inserted in the connecting vacuum insulated pipe 40 from its both ends, and the main-body vacuum insulated pipes 20 are connected thereto.

[Technical Effects of Transportation Pipe]

The main-body vacuum insulated pipe 20 and the connecting vacuum insulated pipe 40 each have a double pipe structure having the vacuum part 23 or 43 inside. This can effectively suppress heat transfer to/from the inside from/to the outside of the pipes, and reduce heat intrusion into the pipes and heat escape from the pipes, and accordingly obtain a high heat insulation effect.

In the transportation pipe 10, the main-body vacuum insulated pipe 20 surrounds the circumference of the central pipe 30 over almost its full length, and between ends of the main-body vacuum insulated pipes 20, the connecting vacuum insulated pipe 40 surrounds the circumference of the central pipe 30. Hence, when plural central pipes 30 are connected to one another, the main-body vacuum insulated pipes 20 or the connecting vacuum insulated pipe 40 surround the circumferences of the central pipes 30 without a break, and vacuum insulation can be achieved. Therefore, even when the transportation substance is transported by the connected central pipes 30 over a long distance, it can be effectively insulated.

Making the main-body vacuum insulated pipe 20 slidable with respect to the connecting vacuum insulated pipe 40 generates the gap although it is very small. However, because temperature gradient can be obtained according to the inserted length of the main-body vacuum insulated pipe 20 into the connecting vacuum insulated pipe 40, as far as a sufficient inserted length can be ensured, the insulation effect is not reduced.

Further, in the transportation pipe 10, plural main-body vacuum insulated pipes 20 are connected by a connecting vacuum insulated pipe (s) 40. Hence, without each main-body vacuum insulated pipe 20 made long, the transportation pipe 10 can easily deal with a long transportation distance. Further, because each main-body vacuum insulated pipe 20 does not need to be longer than necessary, the main-body vacuum insulated pipes 20 and the connecting vacuum insulated pipes 40 can be manufactured with their vacuum parts 23 and 43 formed, at a factory or the like in advance.

Hence, at the time of construction, no air purging or testing for the vacuum state is needed at the site, and the construction can be easy. Thus, the transportation pipe 10 having high workability can be provided.

Further, the main-body vacuum insulated pipes 20 are not directly connected to one another by welding or the like. The main-body vacuum insulated pipes 20 can be connected to one another by being inserted into the connecting vacuum insulated pipe (s) 40 without welding or the like. Hence, no welding work or the like is needed, and neither testing after welding nor connecting work is needed. From this perspective too, the workability can be improved.

Further, because the main-body vacuum insulated pipe 20 and the connecting vacuum insulated pipe 40 each have a double pipe structure having the vacuum part 23 or 43 inside, they have higher manufacturing costs than ordinary ones around which heat-insulating materials are wrapped, but can significantly reduce work costs for installation at the site, and further can obtain a high energy saving effect thanks to the excellent insulation effect, namely, heat loss being equal to or less than ¹⁄₁₀₀ of the conventional heat-insulating materials (described in Example below), and therefore have an advantage in total costs.

Further, connecting work of connecting the main-body vacuum insulated pipes 20 to one another is performed by the main-body vacuum insulated pipes 20 being inserted into the connecting vacuum insulated pipe 40. This can tremendously reduce a load of the connecting work.

Further, no joining work, such as welding, to join the main-body vacuum insulated pipes 20 to one another or to join the main-body vacuum insulated pipe (s) 20 to the connecting vacuum insulated pipe 40 is needed. Hence, there is no concern about vacuum break by welding work, and occurrence of a lost state of the insulation state can be effectively reduced.

Further, no testing for the vacuum state at the site is needed.

Further, the connecting vacuum insulated pipe 40 can slide with respect to the main-body vacuum insulated pipe 20. Hence, even after the main-body vacuum insulated pipes 20 are connected, the connecting vacuum insulated pipe 40 can be easily moved, and the testing for the welded state of the connected ends of the central pipes 30, maintenance check in the future, and so forth can be easily performed.

In particular, by using not the corrugated pipe but the straight pipes as each of the inner pipe 41 of the connecting vacuum insulated pipe 40 and the outer pipe 22 of the main-body vacuum insulated pipe 20, the connecting vacuum insulated pipe 40 and the main-body vacuum insulated pipe 20 can easily and smoothly perform the sliding movement along the axial direction and the sliding movement in the rotation direction around the axis with respect to, one another. This can improve work efficiency. Further, by the above, the connecting vacuum insulated pipe 40 and the main-body vacuum insulated pipe 20 are unrestricted from one another. Hence, when receiving the external force, the connecting vacuum insulated pipe 40 or the main-body vacuum insulated pipe 20 performs the sliding movement in the axial direction or the rotational movement around the axis. This can reduce influence of the external force, such as destruction or damage.

It should be noted that one of the inner pipe 41 of the connecting vacuum insulated pipe 40 and the outer pipe 22 of the main-body vacuum insulated pipe 20 may be the straight pipe, and the other thereof may be the corrugated pipe.

Further, in a conventional transportation pipe for a fluid, if the flux state of a liquid in the pipe suddenly changes, a phenomenon called water hammer occurs owing to pressure change. This occurs not only in a water piping system but also by vapor. A repeat of the shock of the water hammer causes destruction of a support base, separation of a lagging material, damage to a bulb mechanism, and so forth about the conventional transportation pipe.

On the other hand, in the transportation pipe 10, the central pipe 30 is arranged in the main-body vacuum insulated pipe 20 and the connecting vacuum insulated pipe 40, is not directly fixed to the support base, and is not fixed to the main-body vacuum insulated pipe 20, either. Hence, even if the water hammer occurs in the central pipe 30, influence thereof on the main-body vacuum insulated pipe 20 or the connecting vacuum insulated pipe 40 is small, and accordingly occurrence of damage or wear damage to the whole transportation pipe 10 can be suppressed, and the equipment can have a longer service life.

[Additional Element: Spacer]

As described above, the central pipe 30 is not fixed in the main-body vacuum insulated pipe 20. This is no problem if the installation place of the transportation pipe 10 is horizontal. However, if the transportation pipe 10 is installed on sloping ground or installed vertically, a spacer 51 for fixing the central pipe 30 to the main-body vacuum insulated pipe 20 may be provided in the main-body vacuum insulated pipe 20.

Figure 3:
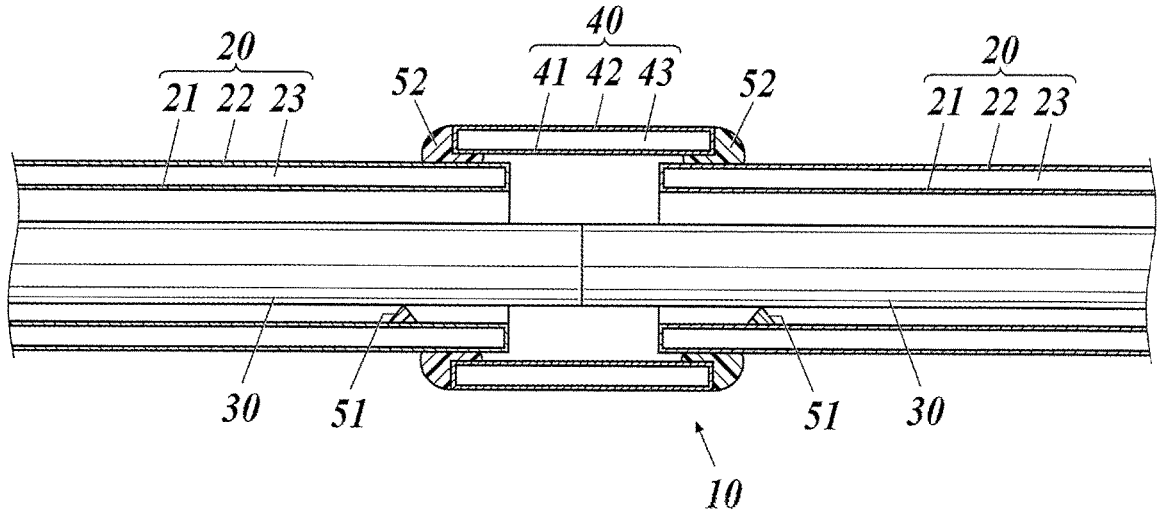
FIG. 3 is a cross-sectional view of the transportation pipe to which spacers and seal materials are added.

The spacer 51 may be, for example, glued to fix the central pipe 30, but preferably keeps its position by friction in order to allow the central pipe 30 to move according to thermal contraction or thermal expansion. In FIG. 3, the spacer (s) 51 is arranged only on the lower side of the central pipe(s) 30, but may be arranged to surround the circumference (s) of the central pipe(s) 30.

[Additional Element: Seal Material]

In light of the connecting vacuum insulated pipe 40 being movable with respect to the main-body vacuum insulated pipe 20, it is difficult to eliminate the gap between these.

However, presence of the gap may cause heat intrusion or heat escape through the gap, and affect the heat-insulating performance. Further, if the transportation pipe 10 is installed outside, rainwater intrusion may also occur.

Then, as shown in FIG. 3, between the main-body vacuum insulated pipe(s) 20 and the connecting vacuum insulated pipe 40, a seal material (s) 52 for preventing moisture intrusion may be provided. Preferable examples of the seal material 52 include a paper tape, a fabric tape, a glass tape, a plastic tape, packing made of resin or rubber, and grease, each of which can adjust its diameter according to the gap.

[Additional Element: Corrugation of Connecting Vacuum Insulated Pipe]

Connective end faces of the central pipes 30 may be inclined planes to be bent at a connection part to bend a transportation path.

In this case, it is difficult for the connecting vacuum insulated pipe 40 having the inner pipe 41 and the outer pipe 42 each formed of the straight pipe to connect the main-body vacuum insulated pipes 20 to one another.

Figure 4:
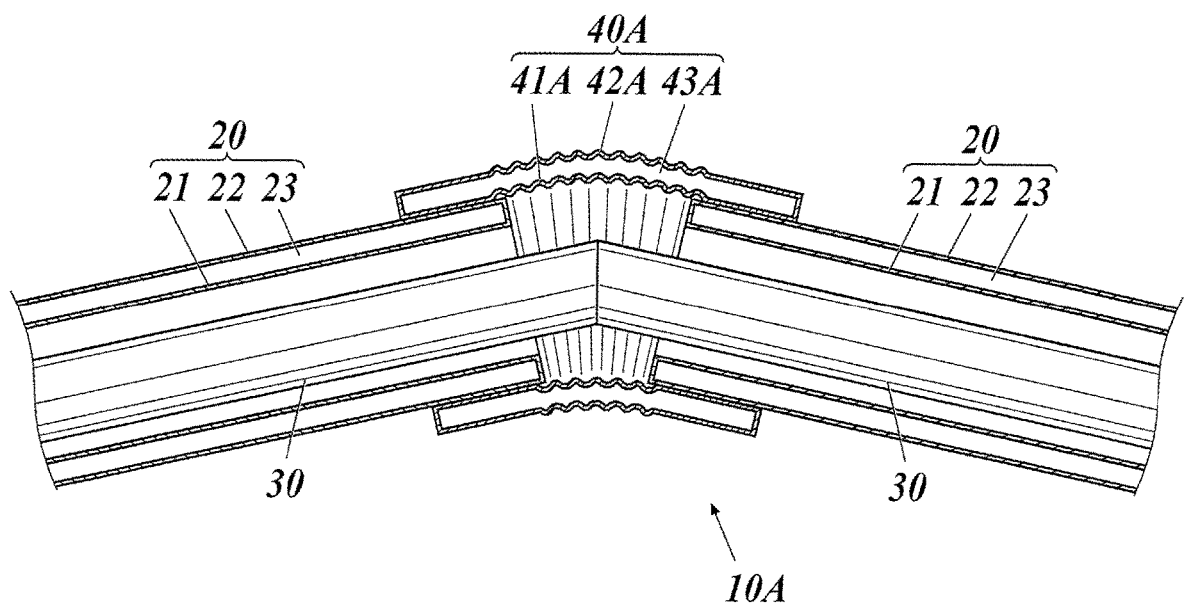
FIG. 4 is a cross-sectional view of a connecting vacuum insulated pipe using partly-corrugated pipes.

Then, as shown in FIG. 4, there is preferably used a connecting vacuum insulated pipe 40A having an inner pipe 41A and an outer pipe 42A each formed of a pipe corrugated except for its ends.

The connecting vacuum insulated pipe 40A having the inner pipe 41A and the outer pipe 42A each formed of the partly-corrugated pipe is stretchable in the lengthwise direction. Hence, the connecting vacuum insulated pipe 40A can be easily bent by a part of its circumference stretching and its opposite contracting.

Hence, in the case where the transportation path of the central pipes 30 is bent, the connecting vacuum insulated pipe 40A can connect the main-body vacuum insulated pipes 20 to one another in a state which corresponds to the bend, by bending so as to correspond to the bend. That is, a transportation pipe 10A for a bent path can be formed.

In the above, as the connecting vacuum insulated pipe 40A, the partly-corrugated pipe, the both ends of which are straight, is cited. However, if each of the main-body vacuum insulated pipes 20 is the straight pipe, the corrugated pipe, which is corrugated over its full length, may be used to connect the main-body vacuum insulated pipes 20 to one another. In this case too, the connecting vacuum insulated pipe 40 and the main-body vacuum insulated pipes 20 can perform the sliding movement in the axial direction and the rotational movement around the axis with respect to one another.

[Additional Element: Halved Structure of Connecting Vacuum Insulated Pipe]

If the transportation path of the central pipes 30 is greatly bent, it is difficult to move the connecting vacuum insulated pipe 40 or 40A to the corner of the bending by the sliding movement. Then, it may be thought of forming a bent connecting vacuum insulated pipe 40 in advance. However, in that case, when the central pipes 30 are connected to one another, the connecting vacuum insulated pipe 40 cannot be evacuated (moved) to an evacuation position.

Figure 5:
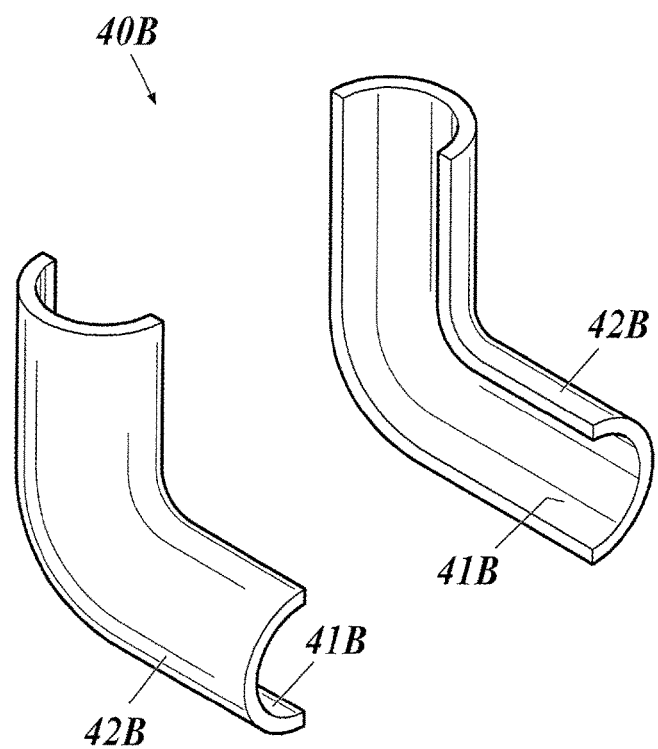
FIG. 5 is a cross-sectional view of a connecting vacuum insulated pipe having a halved structure.

Then, in such a case, as shown in FIG. 5, a connecting vacuum insulated pipe 40B having a halved structure is preferred.

The connecting vacuum insulated pipe 40B is formed of two members into which a bent pipe (elbow pipe) is divided by a halving plane that is along the center line of the pipe path. Each of these two members includes a half inner pipe 41B and a half outer pipe 42B, and is made airtight by a gap between the pipes at each of the both ends and at the cut surface generated by the halving is completely sealed up, and a vacuum part is formed by evacuating (purging air from) the airtight inner space.

Thus, in the case of the connecting vacuum insulated pipe 40B having the halved structure, when the transportation pipe 10 is constructed, the central pipes 30 before being connected to one another are inserted into the main-body vacuum insulated pipes 20, and in this state, the central pipes 30 are welded in a bent state. Then, the testing for the welded state, the airtight state, the joint strength and so forth as well as the pressure test are performed on the central pipes 30 connected by welding, and thereafter positions of the main-body vacuum insulated pipes 20 are adjusted, and the two members constituting the connecting vacuum insulated pipe 40B are attached such that the two members sandwich the connection part of the central pipes 30 from both sides, and their cut surfaces fit one another.

In this case, the two members of the connecting vacuum insulated pipe 40B may be welded, but preferably coupled by a fastening or the like which fastens a thing by winding around it, such as a tape or a belt, without using a joining method, such as welding. The two members are arranged such that ends of the main-body vacuum insulated pipes 20 are inserted into the respective ends of the elbow pipe into which the two members are integrated.

Thus, even in the case of the bent path of the central pipes 30, the connecting vacuum insulated pipe 40B connects the main-body vacuum insulated pipes 20 to one another to insulate the central pipes 30, which form the bent path.

The two members constituting the connecting vacuum insulated pipe 40B may use half bodies of the partly/fully-corrugated pipe as each of its inner pipe and outer pipe.

EXAMPLE

The transportation pipe 10 configured as described above will be described more specifically about its dimensions and so forth.

Each central pipe 30 was 125A (what is called "nominal pipe size A") in a standard defined for pipes for vapor transportation, and had an outer diameter of 141.3 [mm] and a length of 12 [m].

For this, each main-body vacuum insulated pipe 20 having an inner diameter of the inner pipe 21 of φ150 [mm], an inner diameter of the outer pipe 22 of φ170 [mm], and a length of 11 [m], and each connecting vacuum insulated pipe 40 having an inner diameter of the inner pipe 41 of φ175 [mm], an inner diameter of the outer pipe of φ200 [mm], and a length of 2 [m] were used. The gap between the outer pipe 22 of the main-body vacuum insulated pipe 20 and the inner pipe 41 of the connecting vacuum insulated pipe 40 was 0.2 [mm] or less.

The central pipe 30 was 1 [m] longer than the main-body vacuum insulated pipe 20, so that both ends of the central pipe 30 each protruded 0.5 [m] therefrom.

When the central pipes 30 were welded, ends of the main-body vacuum insulated pipes 20 were 1 [m] away from one another. Hence, the testing on the connection part of the central pipes 30 connected by welding can be performed properly.

Further, when the main-body vacuum insulated pipes 20 were connected to one another by the connecting vacuum insulated pipe 40, the inserted length of each of the main-body vacuum insulated pipes 20 into the connecting vacuum insulated pipe 40 was (2−1)/2=0.5 [m].

In the case where the full length of the whole transportation path of the transportation pipe 10 was 120 [m] there were ten connection parts. When 200° C. vapor was transported, a pipe around which a heat-insulating material was wrapped constructed by a conventional method generated a temperature difference of 2° C. between the upper and the lower of the pipe, whereas the transportation pipe 10 constructed by the above-described method generated a temperature difference of 0.02° C. therebetween, which is so close to zero, and reduced heat loss to 1/100 of the conventional pipe.

As a comparative example, there will be described a transportation pipe in which the central pipe 30 was surrounded by the main-body vacuum insulated pipe 20 only without the connecting vacuum insulated pipe, and ends of the main-body vacuum insulated pipes 20 were connected to one another by welding.

This comparative example had no loss due to the gap between the main-body vacuum insulated pipe 20 and the connecting vacuum insulated pipe 40. Hence, in the case where the full length of the whole transportation path of the transportation pipe 10 was 120 [m], the transportation pipe generated a temperature difference of 0.015° C., namely, further reduced the temperature decrease.

However, in such a structure, which the comparative example had, after the central pipes 30 are welded, from the ends of the welded central pipes 30, the main-body vacuum insulated pipes 20 need to be dragged to surround the circumferences of the central pipes 30. Hence, its construction is attended with much difficulty, and while the main-body vacuum insulated pipes 20 are being dragged, the inner walls of the main-body vacuum insulated pipes 20 may be scratched or the like. This may break the airtight state and lose the insulation effect.

In addition, each main-body vacuum insulated pipe 20 needs to be a long pipe corrugated over its full length, which results in high costs.

Thus, compared with the comparative example, the transportation pipe 10 of the example is less likely to lose the insulation effect, is more reliable, and is more durable, and hence is considered to be more excellent in costs and workability.

Further, as another comparative example, there will be described a transportation pipe in which each of the inner pipe 21 and the outer pipe 22 of the main-body vacuum insulated pipe 20 and the inner pipe 41 and the outer pipe 42 of the connecting vacuum insulated pipe 40 was the corrugated pipe, ends of the main-body vacuum insulated pipes 20 were connected to one another by welding, and the transportation substance was made to flow directly in the inner pipes 21 without the central pipes 30 in the main-body vacuum insulated pipes 20.

In such a transportation pipe, because the main-body vacuum insulated pipes 20 are connected to one another by welding, the testing, such as radiographic, ultrasonic, or penetrant testing, needs to be performed on the welded main-body vacuum insulated pipes 20, and hence much effort and time are required at the construction site.

Further, by the shock of the water hammer due to the pressure change of the transportation substance, the main-body vacuum insulated pipe 20 often expands/contracts. This significantly reduces durability of the pipe wall, and is likely to lose the insulation effect by breakage or damage.

Thus, compared with this another comparative example, the transportation pipe 10 of the example is less likely to lose the insulation effect, is more reliable, and is more durable, and hence is considered to be much more excellent in costs and workability.

INDUSTRIAL APPLICABILITY

The transportation pipe of the present invention is industrially applicable to a transportation pipe in which a fluid having a high or low temperature is made to flow.

REFERENCE SIGNS LIST 10, 10A Transportation Pipe
20 Main-body Vacuum Insulated Pipe
21 Inner Pipe
22 Outer Pipe
23 Vacuum Part
30 Central Pipe
40, 40A, 40B Connecting Vacuum Insulated Pipe
41, 41A, 41B Inner Pipe
42, 42A, 42B Outer Pipe
43 Vacuum Part
51 Spacer
52 Seal Material

The invention claimed is:

1. A transportation pipe comprising:
    first and second main-body vacuum insulated pipes each having (i) a double pipe structure with an inner pipe and an outer pipe, and (ii) a vacuum part in a region between the inner pipe and the outer pipe;
    first and second central pipes through which a fluid to be transported flows, the first central pipe being arranged in the first main-body vacuum insulated pipe, the second central pipe being arranged in the second main-body vacuum insulated pipe;
    a connecting vacuum insulated pipe having (i) a double pipe structure with an inner pipe and an outer pipe, and (ii) a vacuum part in a region between the inner pipe of the connecting vacuum insulated pipe and the outer pipe of the connecting vacuum insulated pipe,
    wherein in a state in which the first and second main-body vacuum insulated pipes are inserted in respective ends of the connecting vacuum insulated pipe, ends of the first and second main-body vacuum insulated pipes are away from one another, and the first and second main-body vacuum insulated pipes are connected to one another via the connecting vacuum insulated pipe,
    wherein the connecting vacuum insulated pipe is slidable in both an axial direction and a rotational direction around an axis with respect to the first and second main-body vacuum insulated pipes,
    wherein the connecting vacuum insulated pipe is not present between the ends of the first and second main-body vacuum insulated pipes,
    wherein the connecting vacuum insulated pipe is a cylindrical straight pipe, and
    wherein insertion margins of the connecting vacuum insulated pipe and the first and second main-body vacuum insulated pipes have a length less than a length of the first and second main-body vacuum insulated pipes.

2. The transportation pipe according to claim 1, wherein the outer pipe of the first and second main-body vacuum insulated pipes is a straight pipe.

3. The transportation pipe according to claim 1, wherein the inner pipe of the connecting vacuum insulated pipe is a straight pipe.

4. The transportation pipe according to claim 1, wherein the connecting vacuum insulated pipe is corrugated over a full length or a part of the length of the connecting vacuum insulated pipe.

5. The transportation pipe according to claim 1, wherein the connecting vacuum insulated pipe has a halved structure.

6. The transportation pipe according to claim 1, wherein a spacer is provided between the first central pipe and the first main-body vacuum insulated pipe, and a spacer is provided between the second central pipe and the second main-body insulated pipe.

7. The transportation pipe according to claim 1, wherein a seal material is provided between the connecting vacuum insulated pipe and each of the first and second main-body vacuum insulated pipes.

8. The transportation pipe according to claim 1, wherein the first and second central pipes are not fixed to the first and second main-body vacuum insulated pipes, respectively.

9. The transportation pipe according to claim 1, further comprising a connection part where the first and second central pipes are directly connected to one another, wherein the connection part is away from the ends of the first and second main-body vacuum insulated pipes.

10. The transportation pipe according to claim 1, wherein the inner pipe of the connecting vacuum insulated pipe has a diameter that is larger than a diameter of the outer pipe of the first and second main-body vacuum insulated pipes, and the connecting vacuum insulated pipe has a length that is shorter than a length of the first and second main-body vacuum insulated pipes.

11. The transportation pipe according to claim 1, wherein the connecting vacuum insulated pipe extends over the ends of the first and second main-body vacuum insulated pipes to form a coupling between the connecting vacuum insulated pipe and the first and second main-body vacuum insulated pipes.

12. The transportation pipe according to claim 1, wherein the inner pipe and the outer pipe of the connecting vacuum insulated pipe are each a cylindrical straight pipe having a pipe wall that is not rugged or corrugated.

* * * * *